US008352622B2

(12) United States Patent
Motoyama

(10) Patent No.: US 8,352,622 B2
(45) Date of Patent: Jan. 8, 2013

(54) PRINTER, PRINTER SYSTEM, AND FIRMWARE REWRITING METHOD

(75) Inventor: Hiroyuki Motoyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1472 days.

(21) Appl. No.: 11/725,852

(22) Filed: Mar. 19, 2007

(65) Prior Publication Data

US 2007/0216929 A1    Sep. 20, 2007

(30) Foreign Application Priority Data

Mar. 17, 2006  (JP) .................................. 2006-073996

(51) Int. Cl.
*G06F 15/16* (2006.01)
*G06F 3/12* (2006.01)
*G06F 3/00* (2006.01)

(52) U.S. Cl. ......................... 709/230; 358/1.15; 715/748

(58) Field of Classification Search .................. 358/1.15, 358/1.1; 709/223; 380/287, 51
See application file for complete search history.

(56) References Cited

U.S. PATENT DOCUMENTS

| 6,371,591 B1 * | 4/2002 | Conta et al. ..................... 347/19 |
| 6,473,192 B1 * | 10/2002 | Kidani et al. ................. 358/1.14 |
| 6,665,081 B1 * | 12/2003 | Suzuki et al. ................. 358/1.13 |
| 6,752,548 B2 * | 6/2004 | Azami ............................. 400/76 |
| 6,995,851 B2 * | 2/2006 | Sakamoto ..................... 358/1.14 |
| 7,398,331 B2 * | 7/2008 | Aoyama ............................ 710/8 |
| 7,450,265 B1 * | 11/2008 | Austin et al. ..................... 358/1.8 |
| 2002/0018229 A1 * | 2/2002 | Nakamaki et al. ........... 358/1.14 |
| 2003/0035139 A1 * | 2/2003 | Tomita et al. ................. 358/1.15 |
| 2003/0135549 A1 * | 7/2003 | Kuno et al. .................... 709/203 |
| 2004/0068548 A1 * | 4/2004 | Sugita ........................... 709/208 |
| 2004/0101336 A1 * | 5/2004 | Azami ............................. 400/61 |
| 2005/0036348 A1 * | 2/2005 | Aoyama ......................... 365/49 |
| 2005/0168523 A1 * | 8/2005 | Takiguchi ....................... 347/37 |
| 2005/0232031 A1 * | 10/2005 | Fukano .................... 365/189.05 |
| 2006/0279757 A1 * | 12/2006 | Fukano ......................... 358/1.13 |

FOREIGN PATENT DOCUMENTS

| JP | 2001-216115 | 8/2001 |
| JP | 2001-216115 | 10/2001 |
| JP | 2004-21582 | 1/2004 |
| JP | 2004-29876 | 1/2004 |
| JP | 2004-148612 | 5/2004 |

* cited by examiner

*Primary Examiner* — Krisna Lim
*Assistant Examiner* — Margishi Desai

(57) ABSTRACT

Firmware stored in a printer such as an inkjet printer can be rewritten by executing a firmware rewriting process which is not dependent upon the internal processing status of the printer. A printer 1 for executing a printing process based on print data sent from a host computer has a rewriting unit 38 for executing a firmware rewriting process, a print unit 37 for executing processes other than the firmware rewriting process, a rewrite command interpreting unit 32 for detecting a rewrite command that precedes the transmission of rewrite data required for the firmware rewriting process, and a control unit 36 for executing the firmware rewriting process with a priority over all other processes when a rewrite command is detected.

3 Claims, 4 Drawing Sheets

PRINTER, PRINTER SYSTEM, AND FIRMWARE REWRITING METHOD

BACKGROUND OF THE INVENTION

1. Technical Field

The present invention relates to a printer that runs a printing process based on print data sent from a host computer, to a printer system, and to a method for rewriting printer firmware.

2. Related Art

The print mechanism, paper transportation mechanism, and other operations in a printer are controlled by firmware. The firmware is stored in the printer in ROM or flash memory, for example. Firmware is not frequently changed, but can usually be rewritten to add new functions or to correct bugs in existing functions, for example.

Multiple printers are commonly connected to and used over a LAN, and each printer must be running the same firmware in order to maintain a common operating environment across all printers. In order to rewrite the firmware in each of the plural printers connected to a network, Japanese Unexamined Patent Appl. Pub. JP-A-2001-216115 teaches broadcasting the rewrite data from a host computer to all of the printers, each of which then runs a firmware rewriting process to update the firmware based on the received rewrite data.

In order to ensure that each printer executes the same rewriting process when rewriting firmware in a plurality of printers, the rewrite operation is determined to have failed if only one printer fails to rewrite the firmware even though all other printers have successfully rewritten the firmware. This then requires all printers to repeat the firmware rewriting operation. Rewriting the firmware can fail when an internal printer error is caused by an ink end, no paper, or open cover error, for example, and the printer is in a standby state waiting for the error to be corrected, or the printer is in the middle of a print job and the rewrite data cannot be received into the receive buffer of the printer.

If the printer system has numerous printers connected to a central server such as in a retail store, ink end errors and other types of errors occur frequently and many printers are typically executing a print job at any particular time. As a result, rewriting the firmware can be rendered practically impossible if the rewriting operation must wait until all printers can run the firmware rewriting process at the same time.

SUMMARY

A printer, a printer system, and a firmware rewriting method according to the present invention enable rewriting firmware without being dependent upon the internal processing status of the printer.

A printer according to a preferred aspect of the invention is a printer for executing a printing process based on print data sent from a host computer, the printer having: a rewriting unit for executing a firmware rewriting process; a rewrite command interpreting unit for detecting a rewrite command that precedes rewrite data that is required for the firmware rewriting process and is sent from the host computer; and a control unit for executing the firmware rewriting process with priority over all other processes when a rewrite command is detected.

Another aspect of the invention is a firmware rewriting method for rewriting firmware in a printer that executes a printing process based on print data sent from a host computer, the method including steps, of: detecting a rewrite command that precedes firmware sent from the host computer; and executing a firmware rewriting process with priority over all other processes.

When a rewrite command for rewriting the firmware is detected, the firmware rewriting process is executed with priority over all other internal processes so that the firmware can be rewritten without depending on the internal processing status of the printer.

Preferably, the printer and the firmware rewriting method generate a status signal indicating a rewrite state when a rewrite command is detected. This status signal can be used to inform the user of the internal processing state of the printer so that, for example, problems arising from turning the printer power off while the firmware is being rewritten can be avoided and so that the host computer can be prevented from executing other processes on the printer while the firmware rewriting process is executing.

A printer system according to another aspect of the invention has the printer according to the invention and a host computer connected to the printer over a network, and the host computer broadcasts the rewrite command to the printer.

By broadcasting the rewrite command to the printers on the network, the firmware rewriting process can be preferentially executed on all printers connected to the network and the likelihood of rewrite failures can be reduced. Furthermore, because the firmware can be rewritten on all printers en masse without waiting for frequently occurring errors to be corrected, the cost of rewriting firmware in a network environment can be reduced.

The invention thus enables rewriting firmware independently of the internal processing status of the printer because the printer gives priority to executing the firmware rewriting process over all other internal processes when the printer detects a rewrite command for rewriting the firmware.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of a printer, a printer system, and a printer control method according to the present invention is described below with reference to the accompanying figures. A printer according to this embodiment of the invention is an inkjet printer that is communicably connected to a host computer over a network and prints based on control commands and print data sent from the host computer.

Printer Appearance

Figure 1:
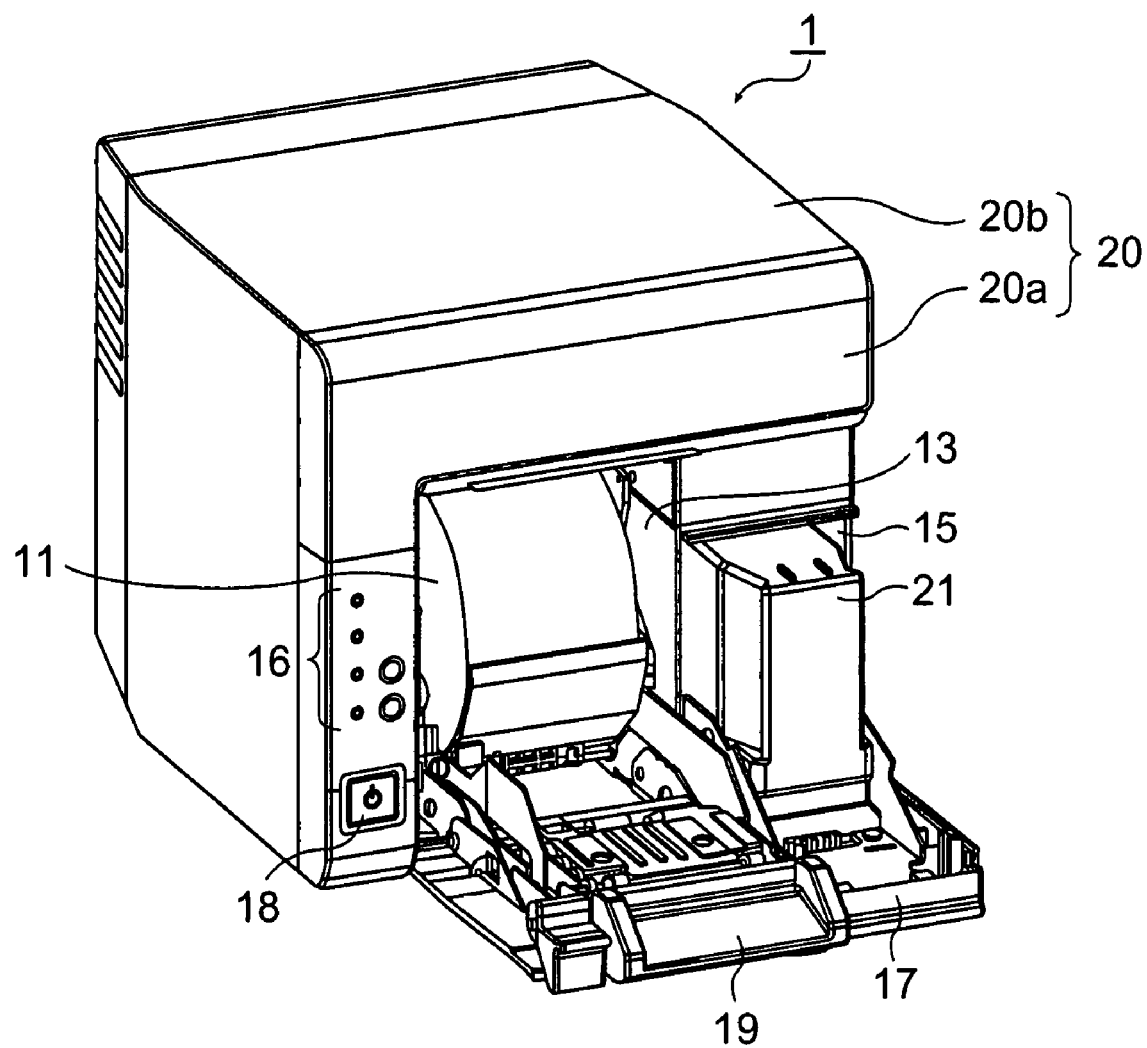
FIG. 1 is an oblique view showing the inside of a printer according to a preferred embodiment of the invention when the two front printer covers are open.

FIG. 1 is an external oblique view showing the printer according to this embodiment of the invention with the two front covers open. The printer 1 according to this embodiment of the invention uses plural colors of ink to print color images on roll paper 11 and issue coupons, for example. As shown in FIG. 1, the printer 1 has a power switch 18, a roll paper cover 19, and an ink cartridge compartment cover 17 disposed in order from the left at the front of the printer case 20, which includes a front top panel 20a and a case cover 20b. LEDs 16 for reporting the printer 1 or host computer 50 status to the user are disposed above the power switch 18. The roll paper cover 19 and ink cartridge compartment cover 17 can swing on a hinge not shown disposed at the bottom to open and close to the front of the printer 1.

Opening the roll paper cover 19 opens the paper compartment 13 where the roll paper 11 used for printing is held, and thus enables replacing the roll paper 11. Opening the ink cartridge compartment cover 17 similarly opens the ink cartridge compartment 15 so that the ink cartridge 21 can be loaded and removed.

The ink cartridge 21 is a package containing three color ink packs for yellow, cyan, and magenta inside a cartridge case. Opening and closing the ink cartridge compartment cover 17 in the printer 1 according to this embodiment of the invention also causes the ink cartridge 21 to slide between the cartridge replacement position and the printing position inside the ink cartridge compartment 15.

Relationship Between the Host Computer and Printer

Figure 2:
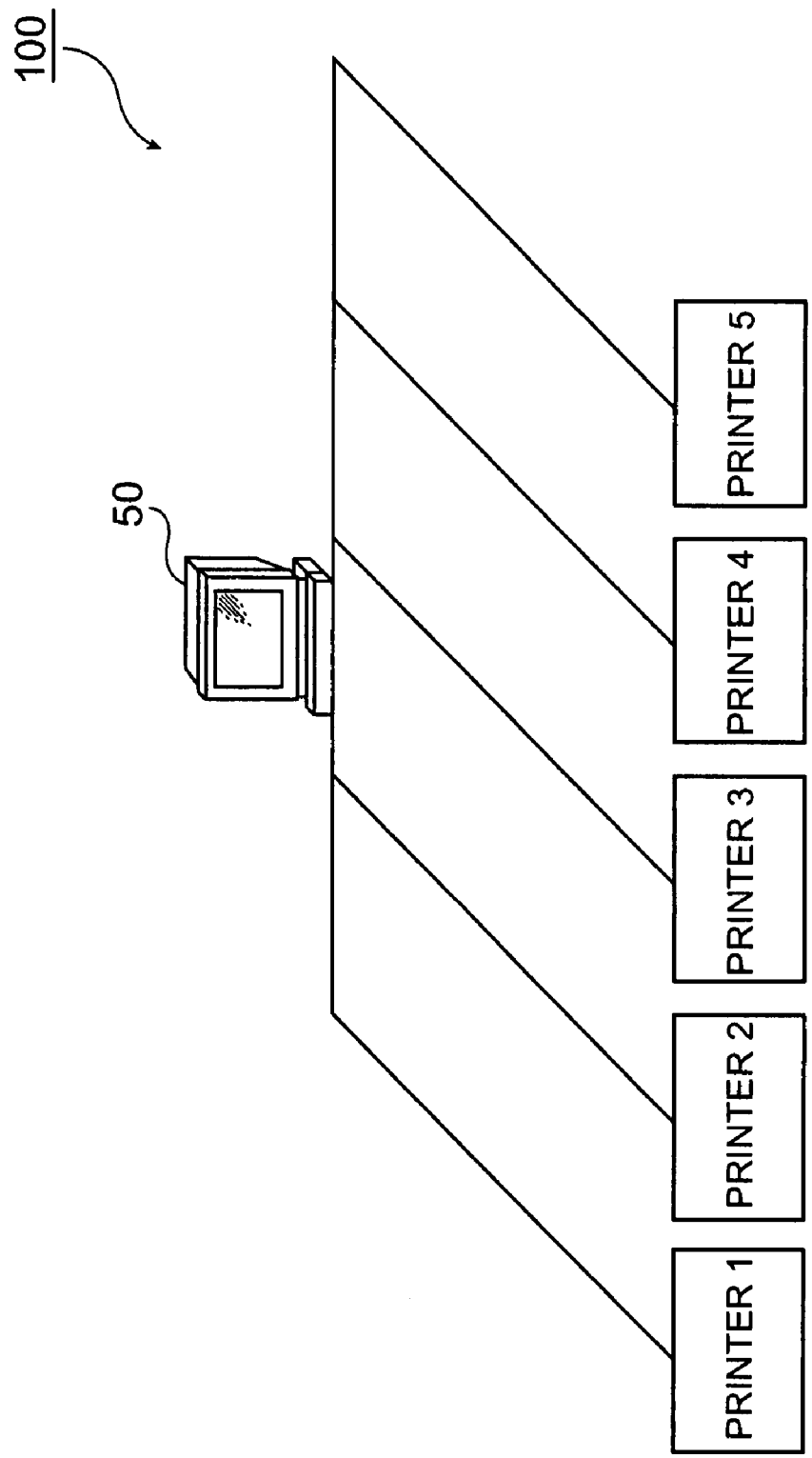
FIG. 2 schematically shows a printer system according to a preferred embodiment of the invention.
Figure 3:
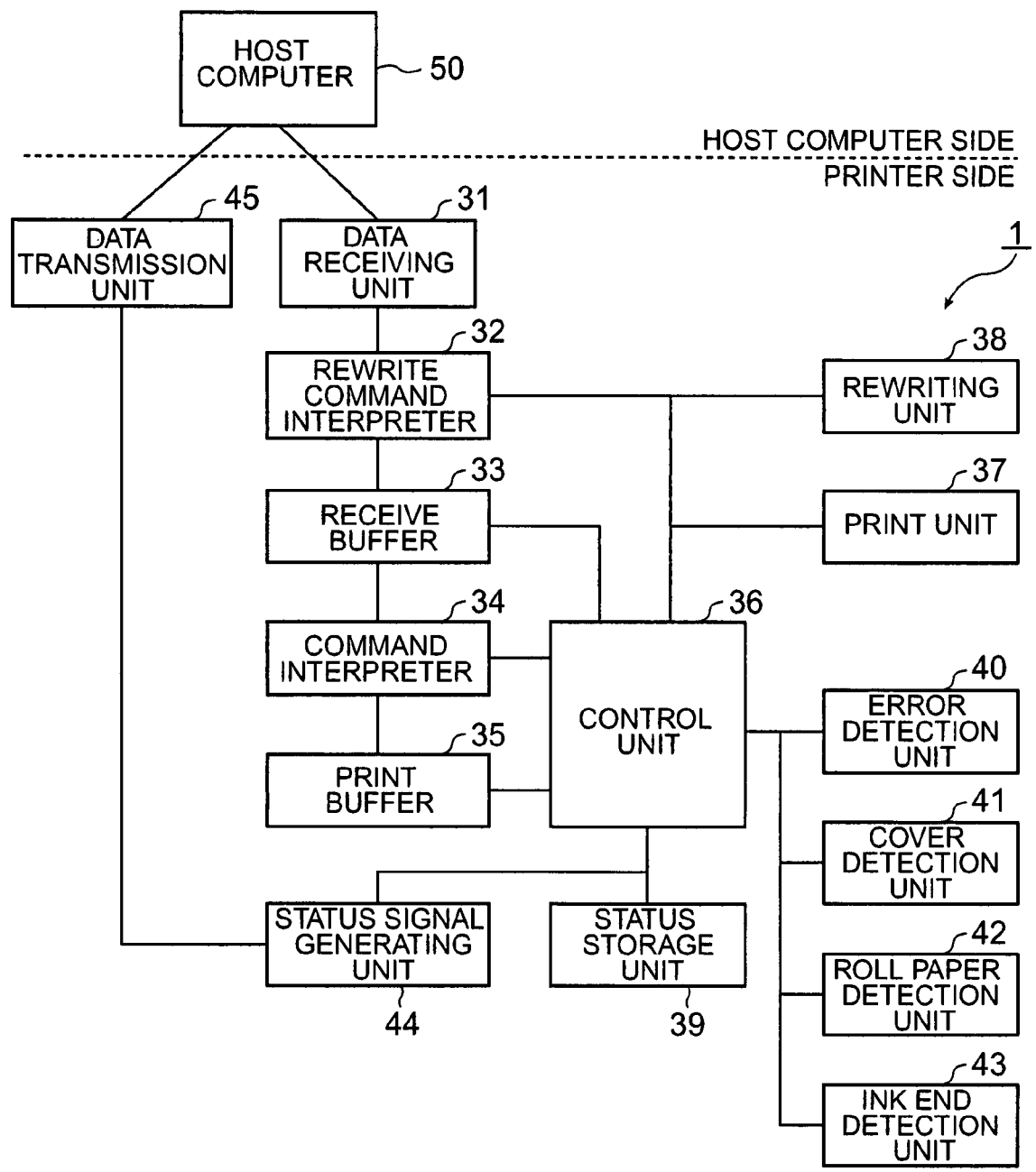
FIG. 3 is a function block diagram showing the internal processes of a printer system according to a preferred embodiment of the invention.

The relationship between the host computer 50 and the printer 1 in this embodiment of the invention is described next with reference to FIG. 2 and FIG. 3. FIG. 2 is a schematic diagram of a printer system having a plurality of printers connected to a host computer 50. FIG. 3 is a function block diagram showing internal processing by the host computer 50 and one printer 1 in this printer system 100.

As shown in FIG. 2 the printer system 100 has a plurality of printers 1 to 5 connected to a host computer 50 over a LAN or other network. The host computer 50 sends control commands and print data to the printers 1 to 5 to control the printer system 100. An internal CPU in each printer 1 to 5 executes firmware stored in flash ROM to execute a printing process, firmware rewriting process, and other operations. This embodiment of the invention is described using communication between the host computer 50 and printer 1 by way of example.

Firmware Rewriting Process

As shown in FIG. 3 the main parts of the printer 1 are a data receiving unit 31, a rewrite command interpreter 32, a receive buffer 33, a command interpreter 34, a print buffer 35, a control unit 36, a print unit 37, and a rewriting unit 38.

The data receiving unit 31 receives data sent from the host computer 50. The rewrite command interpreter 32 interprets data sent from the host computer 50. To rewrite the firmware, the host computer 50 sends a rewrite command. The rewrite command is a command defined for executing the rewrite process with priority over other internal printer processes, and is issued before the rewrite data is sent.

When the rewrite command interpreter 32 detects a rewrite command, the control unit 36 causes the rewriting unit 38 to operate with priority over other processes in order to rewrite the firmware stored in flash ROM. Processes that the printer executes in addition to this firmware rewriting process include printing processes and error handling processes that take the printer off-line until an error that is detected by one of the detection units described below is corrected. More specifically, these internal error handling processes set the printer to a standby mode until the cause of the error, which could be an ink end error, no paper error, or cover open error, for example, is corrected. The control unit 36 causes the rewriting unit 38 to execute the firmware rewriting process with priority over the printing process and other internal processes that cause the printer to wait until an error is corrected.

The receive buffer 33 stores data sent from the host computer 50.

The command interpreter 34 reads data from the receive buffer 33 in FIFO sequence, and separates the control commands from the print data.

When a control command is detected the control unit 36 controls the specific operation or printer setting based on the control command. When print data is detected, the control unit 36 controls storing a printing pattern based on the print data in the print buffer 35. When a firmware rewrite command, which is a type of control command, is detected, the control unit 36 controls wiping the print data stored in the print buffer and storing the rewrite data (firmware) following the rewrite command in the print buffer.

The print unit 37 reads print data from the print buffer 35 to print.

The printer 1 also has a status storage unit 39, an error detection unit 40, a cover detection unit 41, a roll paper detection unit 42, and an ink end detection unit 43.

The error detection unit 40 detects paper jams and other errors. The cover detection unit 41 detects if the roll paper cover 19 is open. The roll paper detection unit 42 detects the end of the roll paper. The ink end detection unit 43 detects the end of ink in the ink cartridge 21. The status storage unit 39 stores the internal printer status based on the detection signals from the detection units.

The printer 1 also has a status signal generating unit 44 and a data transmission unit 45.

The status signal generating unit 44 generates a status signal if no error is indicated when the rewrite command is received and an error (including fatal errors) occurs when the rewrite process is executed. The status signal generating unit 44 could output a status signal indicating that the printer 1 can run the rewrite process when the rewrite command is detected.

The data transmission unit 45 sends the status signal output by the status signal generating unit 44 to the host computer 50.

Figure 4:
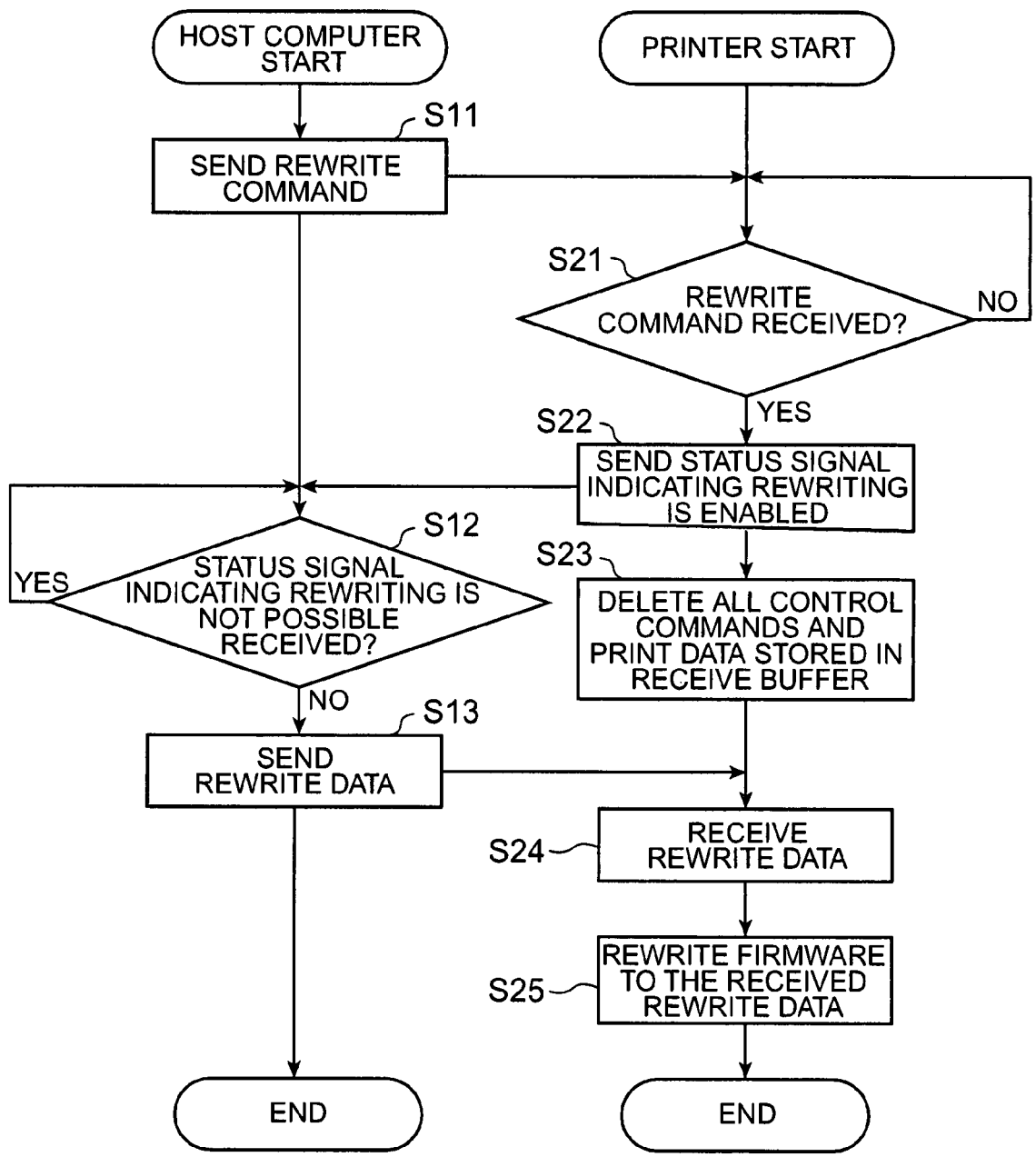
FIG. 4 is a flow chart of the firmware rewriting process in a printer according to a preferred embodiment of the invention.

FIG. 4 is a flow chart describing the firmware rewriting process.

The firmware rewriting process starts when the host computer 50 sends a rewrite command for executing the rewrite process regardless of a status signal and takes precedence over other internal processes of the printer before sending the rewrite data (step S11).

If a fatal error, for example, occurs and the printer 1 then detects a rewrite command (step S21 returns Yes), the printer 1 returns a status signal indicating that the rewrite command cannot be executed to the host computer 50 (step S22). If a control command and print data is already stored in the print buffer, the printer 1 deletes the stored data and then receives the rewrite data (step S23). Step S23 is executed after the correction of the printer error when the error occurs. Therefore, a waiting step for the error recovery (error correction) is necessary between step 22 and step 23.

If a status signal indicating a fatal error is not received (step S12 returns No), the host computer 50 sends the rewrite data (step S13).

The printer 1 then receives the rewrite data (step S24) and rewrites the firmware with the received rewrite data (step S25).

When a printer error such as an ink end error, no paper error, or open cover error occurs and the printer is executing an internal process that waits for the cause of the error to be corrected, or when the printer is internally executing a printing process and the receive buffer cannot receive data for rewriting the firmware, the present invention enables executing the firmware rewriting process with priority over other internal processes and printing processes. The firmware can therefore be rewritten without depending on the internal processing status of the printer.

If the printer generates a status signal indicating that the firmware is being rewritten when the firmware rewriting process executes so that the user knows the internal processing status of the printer, problems caused by the user turning the printer power off while the firmware is being rewritten can be avoided. If the status signal is sent to the host computer, the host computer can also be prevented from sending other process commands to the printer while the firmware rewriting process is executing.

This embodiment of the invention describes rewriting the firmware based on commands sent from a host computer to printers connected to a network, but the invention can also be used to rewrite firmware in an individual printer. When applied to a printer system having a plurality of printers connected over a network, the rewrite process can be executed with priority on all networked printers and the likelihood of a rewrite failure can be reduced by broadcasting the rewrite command to all networked printers at the same time. Furthermore, because the firmware can be rewritten on all printers en masse without waiting for frequently occurring errors to be corrected, the cost of rewriting firmware in a network environment can be reduced.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A set of printers, each printer of the set being configured to execute one or more printing processes based on print data sent from a host computer, each printer comprising:
 a rewrite command interpreting unit that detects a rewrite command broadcast from the host computer connected to the printer over a network;
 a status signal generating unit that generates and sends to the host computer a first status signal indicating a rewrite state of the printer when the rewrite command is detected;
 a rewriting unit that executes a firmware rewriting process; and
 a control unit responsive to the rewrite command interpreting unit and configured to delete a control command and associated print data stored in a print buffer, receive rewrite data, and direct the rewriting unit to execute the firmware rewriting process with priority over all other internal processes of the printer when the rewrite command is detected;
 wherein the status signal generating unit generates and sends to the host a second status signal when the firmware rewriting process is executing, and
 wherein the firmware is preferentially written to all of the printers in the set of printers based on the broadcasted rewrite command.

2. A printer system, comprising:
 a printer having a rewriting unit that executes a firmware rewriting process; and
 a host computer connected to the printer over a network; wherein
  the host computer broadcasts a rewrite command to the printer,
  the printer detects the rewrite command,
  the printer generates and sends to the host computer a first status signal indicating a rewrite state of the printer when the rewrite command is detected, and
  the printer deletes a control command and associated print data stored in a print buffer, receives rewrite data, directs the rewriting unit to execute the firmware rewriting process with priority over all other processes when a rewrite command is detected, and generates and sends to the host computer a second status signal when the firmware rewriting process is executing.

3. A firmware rewriting method for rewriting firmware stored in each of a plurality of printers, each of which is adapted to execute a printing process based on print data sent from a host computer, the method, being carried out in each of the plurality of printers, comprising steps of:
 detecting a rewrite command broadcast from the host computer;
 sending a first status signal to the host computer indicating a rewrite state of the particular printer;
 deleting a control command and associated print data stored in a print buffer;
 receiving rewrite data broadcast from the host computer when the rewrite command is detected;
 executing a firmware rewriting process using the rewrite data broadcast from the host computer when the rewrite command is detected such that the firmware rewriting process is carried out with priority over all other internal processes of the printer; and
 sending a second status signal to the host computer when the firmware rewriting process is executing;
 wherein the firmware is preferentially written to all of the printers of the plurality of printers based on the broadcasted rewrite command.

* * * * *